(12) United States Patent
Turner et al.

(10) Patent No.: US 10,768,929 B1
(45) Date of Patent: Sep. 8, 2020

(54) AUTOMATICALLY UPDATING SOURCE CODE IN VERSION CONTROL SYSTEMS VIA A PULL REQUEST

(71) Applicants: Atlassian Pty Ltd., Sydney (AU); Atlassian Inc., San Francisco, CA (US)

(72) Inventors: Bryan Paul Turner, Irvine, CA (US); John Brent Plump, Sydney (AU)

(73) Assignees: ATLASSIAN PTY LTD., Sydney (AU); ATLASSIAN INC., San Francisco, CA (US)

(*) Notice: Subject to any disclaimer, the term of this patent is extended or adjusted under 35 U.S.C. 154(b) by 0 days.

(21) Appl. No.: 16/683,144

(22) Filed: Nov. 13, 2019

(51) Int. Cl.
| G06F 9/44 | (2018.01) |
|---|---|
| G06F 8/71 | (2018.01) |
| G06F 11/36 | (2006.01) |
| G06Q 10/06 | (2012.01) |
| G06F 8/38 | (2018.01) |
| G06F 8/65 | (2018.01) |

(52) U.S. Cl.
CPC .............. G06F 8/71 (2013.01); G06F 8/38 (2013.01); G06F 8/65 (2013.01)

(58) Field of Classification Search
CPC ..... G06F 8/71; G06F 8/70; G06F 8/60; G06F 8/20; G06F 8/35; G06F 8/36; G06F 8/65; G06F 11/3676; G06F 11/3692; G06F 11/3684; G06F 11/3409; G06F 11/3664; G06F 11/3466; G06F 8/38; G06F 11/36; G06F 11/3624; H04L 9/3247; G06Q 10/06; G06Q 10/10
See application file for complete search history.

(56) References Cited

U.S. PATENT DOCUMENTS

| 9,092,224 B2* | 7/2015 | Bartlow | G05B 19/0426 |
|---|---|---|---|
| 9,176,828 B2* | 11/2015 | Jain | G06F 11/1471 |
| 9,430,229 B1* | 8/2016 | Van Zijst | G06F 9/3844 |
| 9,740,476 B2* | 8/2017 | Eberlein | G06F 8/65 |
| 10,467,004 B2* | 11/2019 | Neatherway | G06F 8/77 |
| 2017/0269909 A1* | 9/2017 | Smith | G06F 8/34 |

OTHER PUBLICATIONS

C. Costa, Identifying participants for collaborative merge, 3 pages (Year: 2016).*
Guimaraes et al., Improving early detection of software merge conflicts, 11 pages (Year: 2012).*

* cited by examiner

*Primary Examiner* — Thuy Dao
(74) *Attorney, Agent, or Firm* — Brownstein Hyatt Farber Schreck, LLP

(57) ABSTRACT

A method for automatically updating source code in a first source code branch using a pull request is disclosed. The method includes: displaying a pull request user interface associated with the first source code branch, the pull request user interface comprising a code change suggestion including an original line of source code to be changed and a new line of source code to replace the original line of source code; receiving user input to accept the code change suggestion; propagating the source code change to the first source code branch such that an original line of source code in the first source code branch is replaced with the new line of source code; and upon successfully propagating the source code change to the first source code branch, updating the pull request user interface to indicate that the code change suggestion is applied and the pull request is modified.

18 Claims, 15 Drawing Sheets

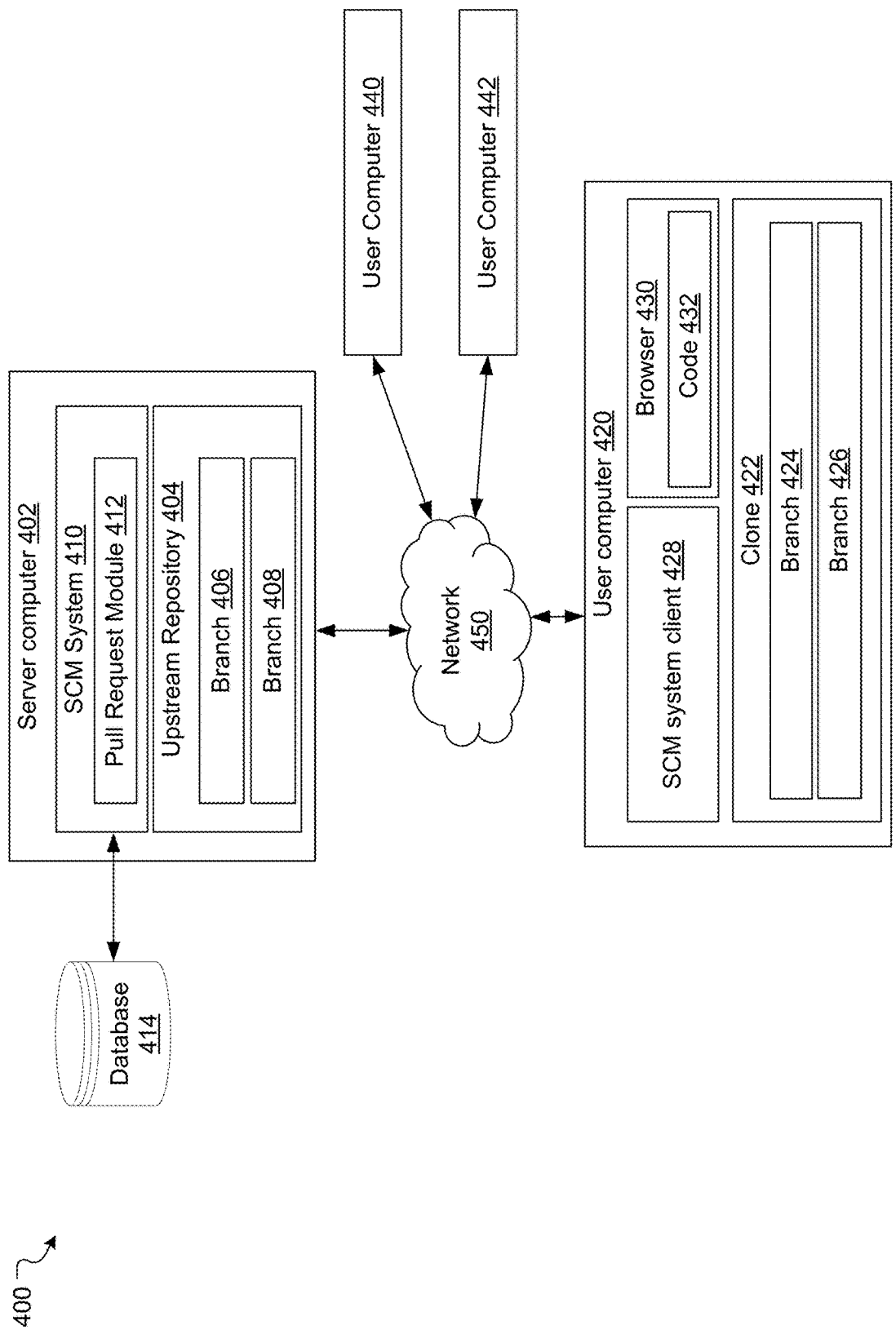

```
                <div class="actions">
                <div class="bb-content-container-header-secondary actions">
                    <div class="aui-buttons">
                        <a href="{{ file_url }}" class="aui-button edit-button">
                            >{% trans "Raw" %}</a>
                    {% endwith %}
                    </div>
                </div>
>>>>>> destination:14f086def7ca48a1a2a0820eac9e64f1a3906d77
                <div class="bb-content-container-body file-source has-header">
                    {{ file|highlight:kitch }}
                </div>
<<<<<< source:6f085ead241e724be80c22f4a47b1f112eaf080c
                </div>
                {% endfor %}
```

AUTOMATICALLY UPDATING SOURCE CODE IN VERSION CONTROL SYSTEMS VIA A PULL REQUEST

TECHNICAL FIELD

The present disclosure generally relates to version control systems as used in computer program development and in particular to techniques for automatically updating source code in version control systems via a pull request.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In computer software development, version control systems, also called source code management (SCM) systems, are used to track and manage computer program source code as the code is written and revised. SCM systems include centralized version control systems and distributed version control systems. Centralized SCM systems typically manage a single copy of a project in a centralized location such as a server computer, and programmers commit changes to the central copy.

Distributed SCM systems such as Mercurial, Git, and Bazaar, do not necessarily use a centralized server computer to store all versions of the code. Each programmer may create a copy of the program source code, termed a clone, which is locally stored in a repository of that programmer or a group; the repository maintains metadata representing a complete history of a project involving the original code, the programmer's changes, and often changes of other programmers. SCM systems with distributed version control typically enable programmers to create, revise, and store computer program source code in the form of text files. The SCM system typically saves a revision to source code by overwriting an existing version of a source code file with a new version of the file. If a programmer revises the source code, stores the new version in the file, compiles the new version of the file, and learns that the execution of the compiled new version results in an error, the programmer may be able to identify the specific revision that introduced the error if the programmer can restore the old version of the file. An SCM system with a version control feature can facilitate the identification of errors by enabling a programmer to access previous and current versions of the source code. These SCM systems support operation with many users who are widely distributed across distant geographic locations yet working on the same source code project, by communication over internetworks.

This approach enables each user to have a full history of the source code. The second copy of the repository may be termed a fork, and the original repository on the server computer may be termed a canonical, main repository, or upstream repository. The SCM system also may enable a user to duplicate or clone the fork, store the clone on the user's computer, work on the clone, and then merge the clone back to the upstream repository, or merge the clone back to a clone of the fork that is on the server computer. With this approach, many users can work on clones of the fork and exchange revisions.

SUMMARY

The appended claims may serve as a summary of the invention.

BRIEF DESCRIPTION OF THE DRAWINGS

In the drawings:

FIG. 4 illustrates an example networked environment in which embodiments of the present disclosure may be implemented;

FIG. 8 illustrates an example code panel 800;

FIG. 9 illustrates a screen shot of a pull request interface where a suggesting user has added a suggested change;

FIG. 10 illustrates a screen shot of a pull request once a suggested change is saved;

DETAILED DESCRIPTION

Figure 1:
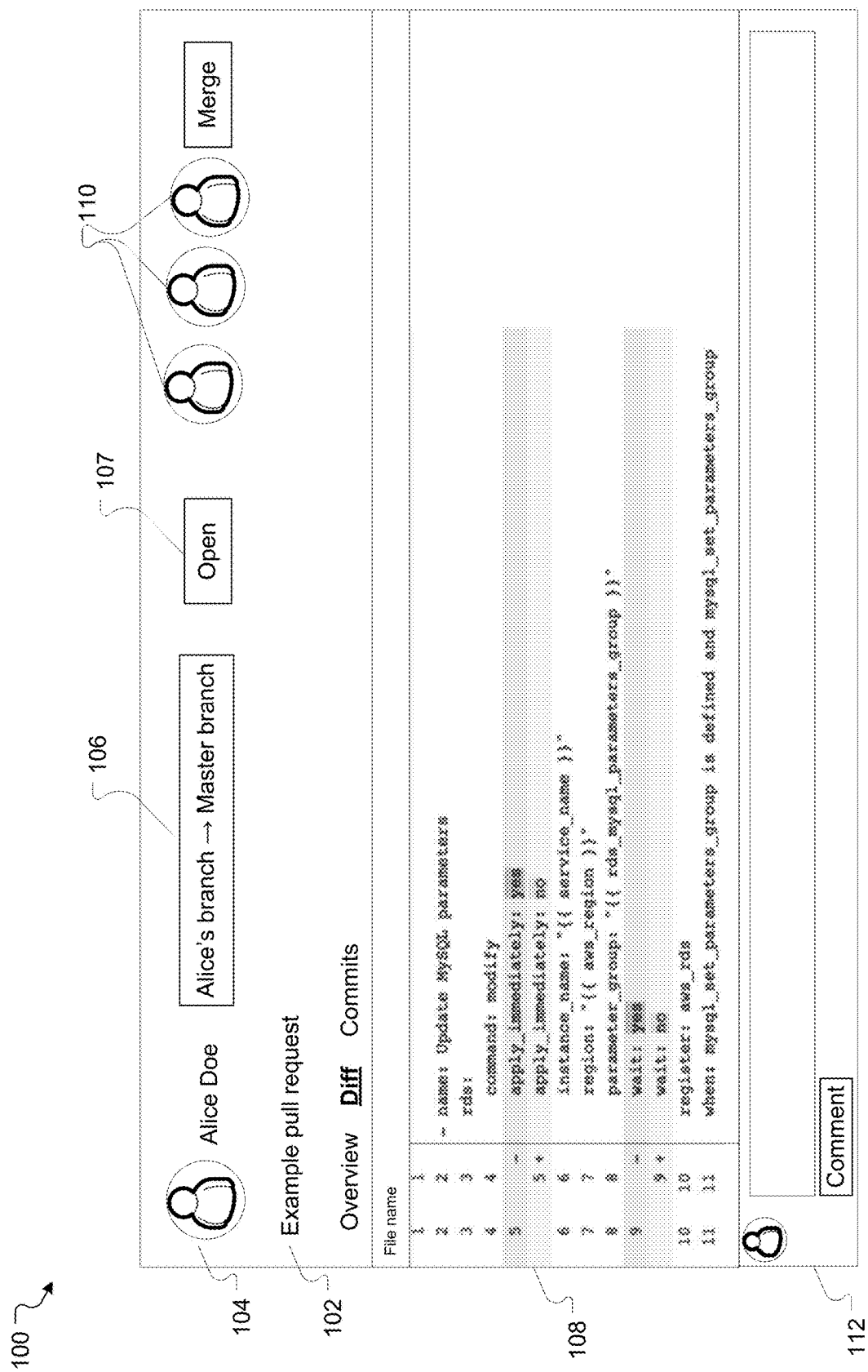
FIG. 1 illustrates a typical pull request interface.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

SCM System Overview

Aspects of the present disclosure are implemented on SCM systems. For example, certain aspects of the present disclosure may be implemented using an on-premises SCM system such as Bitbucket Server, which is commercially available from Atlassian, Inc., and provides a Git repository management system for enterprise users in which repositories are stored on computers that are isolated from the public internet by firewalls and/or other appropriate security systems. Git is a distributed version control and source code management system with an emphasis on speed that was initially developed for Linux kernel development. Each Git working directory is a code repository that has complete history and revision tracking metadata and functions, and is not dependent on network access or a central server.

Other aspects of the present disclosure may be implemented using computers and systems configured in a remote shared data center or cloud computing infrastructure, for example, using Bitbucket Cloud, which also is commercially available from Atlassian. Bitbucket supports storing source code in cloud-based computing instances, in either public or private repositories. Both Bitbucket Server and Bitbucket Cloud support user authentication, repository security, and integration with existing databases and development environments, for use with up to large numbers of users, including thousands of users per repository.

Merging and branching are two concepts used in most SCM systems. Merging comprises combining two or more sets of changes to version-controlled files to result in a merged version with all the changes. In some cases, such as when two or more sets of changes do not conflict, merging may be automatically performed. For example, automatic merging typically involves two non-conflicting sets of changes of two different users to a set of files. If the changes conflict, then manual merging is typically used in prior approaches to reconcile conflicts. For example, manual merging can be used to combine two overlapping, conflicting versions of configuration files by selecting the most desirable configuration commands from each version and placing them in a third, merged version.

Branching comprises duplication of a source code file, directory tree, or other item that is subject to version control, so that changes can be made to the original and the duplicate, each of which is termed a branch. Branches may be termed streams, or code lines. The original branch may be termed the parent branch, master branch, upstream branch, or backing stream. Duplicate branches may be termed child branches. A branch without a parent branch may be termed a trunk or mainline. Changes to a child branch may be merged into the parent branch, or merged into the trunk, even if the trunk is not a direct parent of the child branch. A repository that is derived from and related at least in part to an upstream repository may be termed a fork; typically, a fork is subject to different licensing terms, serves a different purpose, or implements a different feature or function, as compared to its parent.

Further, Git SCM systems such as Bitbucket Server or Bitbucket Cloud include a pull request feature. Generally speaking, a pull request defines a request to merge changes from a source branch to a destination branch, either within the same repository or across clones or forks. The term "pull request" derives from the notion of requesting a manager of the upstream branch for permission to pull a downstream programmer's changes up into the upstream branch, and typically involves review and approval by a user other than the programmer who made the changes. Accepting a pull request comprises or results in merging the source branch into the destination branch.

A pull request may be displayed to one or more reviewers in a user interface (e.g., in a browser). FIG. 1 illustrates a typical pull request interface 100. As shown in the illustration, the pull request interface typically displays, e.g., the name of the pull request 102, the author 104, the source and destination branches 106, a status of the pull request 107, and differences in source code between the state of the source branch when the pull request is generated and the state of the destination branch 108 when the source branch was forked from the destination branch. In computing, a file comparison utility program generically termed 'a diff' is configured to output the differences between two source code files. A diff typically is used to show the changes between one version of a file and a former version of the same file; diff usually displays the changes that are made, per line, for text files. In one example, the differences between the two versions of the file may be highlighted. For instance, if the source branch (new version of the source code file) includes additional code lines that did not exist in the destination branch before the source branch was forked from the destination branch (former version of the source code file), these lines may be highlighted in green. Any deleted code lines may be highlighted in red. The pull request interface 100 may also display information about reviewers 110 of the pull request and a comment section 112 for one or more reviewers/authors to enter comments. The comment section may also display any previous comments made for that pull request.

Typically, upon reviewing the source branch and/or the differences added by author, if the reviewer 110 is not entirely happy with the source branch, the reviewer may include one or more comments in the comment section 112 with suggested changes to the source branch code. The author of the source branch can then review the reviewer's comment(s) in the user interface and action these—e.g., by manually updating the source code in the source branch and then submitting a new pull request with the updated source branch. Thereafter, a reviewer 110 can approve the source branch for merging with the destination branch or include one or more further comments, again through the comment section 112.

Oftentimes, reviewers 110 make comments to fix small errors or trivial mistakes in the source branch code. The known techniques of requiring the reviewer to type this error in as a comment to the author in the pull request user interface 100 and requiring the author to action this manually is time consuming and inefficient.

Recently, systems (e.g., by GitHub) have been introduced that allow reviewers to suggest code changes in a pull request user interface and for authors and/or reviewers to commit these suggested changes in the underlying source branch directly via the pull request user interface 100. Once a request to apply the suggested changes is submitted in this manner, the SCM system proceeds to automatically incorporate the suggested changes to the source branch. This automatic incorporation of suggestions through the pull request user interface 100 allows developers to fix minor issues in the source code with minimal effort and allows simple fixes to be actioned easily and unambiguously.

Problem Domain and Invention Overview

However, there are some issues with this technique for automatically updating the source branch via the pull request interface 100.

Figure 2A:
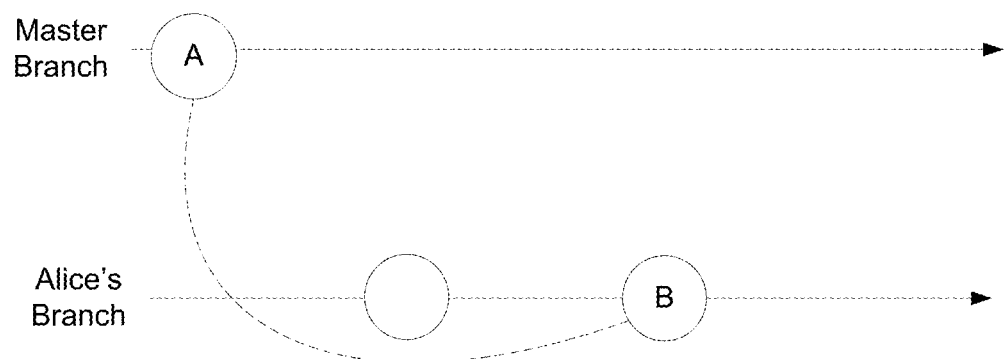
FIG. 2A illustrates a typical pull request diff between a source and target branch.

First, in the GitHub solution, when showing differences 108 between a source branch (e.g., a user's forked branch) and a destination branch (e.g., a master branch), the pull request user interface 100 shows changes between the tip of the forked branch (e.g., Alice's branch) and the point at which Alice's branch was forked from the master branch. This effectively shows all the changes made by Alice that are required to be pulled into the master. FIG. 2A illustrates this scenario where A depicts the state of the master branch when Alice forked from the master to create her own branch and B depicts the state of the tip of Alice's branch.

Figure 2B:
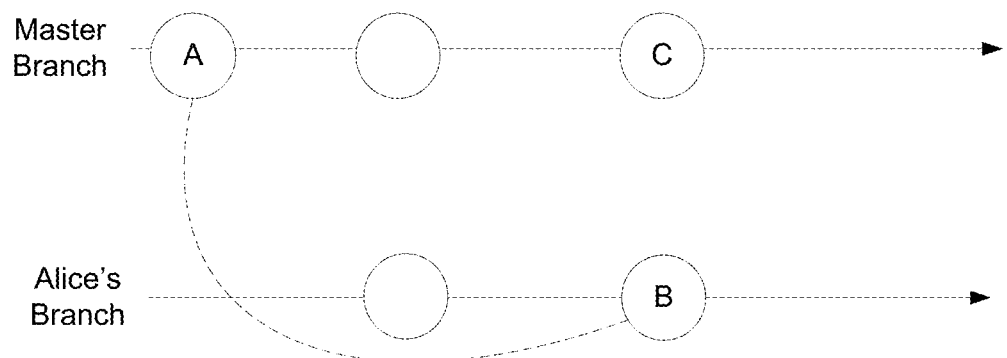
FIG. 2B illustrates an issue with the typical pull request diff between a source and target branch.

There are a couple of issues with this approach of showing differences in a pull request. In real implementation, the master branch may be updated after Alice has forked from the master. For example, other developers may be working on their own branches and merging these into the master branch. FIG. 2B illustrates this scenario. In this example, C is the current state of the master. In this case, the difference between the tip of Alice's branch and state A of the master branch does not show the real differences between the master and Alice's branch, but shows differences between Alice's branch tip and an older version of the master.

Because of this, GitHub's solution to automatically incorporate suggestions from the pull request interface can have more merge conflict issues and logical conflicts. A merge conflict occurs if Alice makes changes on her branch to lines of source code that have already been changed by another developer on the master. Because, the GitHub solution does not show differences between the latest state of the master and the tip of Alice's branch, the reviewer would be unaware of these conflicting changes and may make certain suggestions to change the code in Alice's branch that have already been made and incorporated in the master (thereby doubling work). A logical conflict may arise if developers modify different parts of the same source code file on different branches. In some cases, these different changes that work independently and appear to merge without conflicts can actually create logic bugs when combined.

For example, Alice and another developer (Bob) may notice and fix the same bug on two different branches—but on different lines of the source code. Bob's fix may be incorporated in the master before Alice generates her pull request. However, because the pull request only shows differences between Alice's branch tip and the master when she had forked, Alice's reviewer does not notice that Bob has already fixed this bug in a different line of the source code. In this case, if Bob suggests a change to Alice's fix, in the GitHub solution, once accepted, this suggestion would be merged with Alice's branch and subsequently the master branch cleanly, however, the master will then have both lines—which can be an even more serious bug than that fixed by Alice and Bob. Again, wasting important organizational resources.

Aspects of the present disclosure provide an improved method and system for automatically committing changes to source code in a version control system via a pull request interface. In particular, the presently disclosed systems and methods allow reviewers to suggest changes to source code via a pull request interface and allow authors and/or reviewers to commit one or more suggested changes directly to the underlying code from the pull request interface.

To do this, the presently disclosed systems and methods display differences between the current state of the destination branch and the tip of the source branch such that reviewers can see all the changes to the source code and can make suggested changes based on the entire context around that change. However, to do this, the presently disclosed systems and methods create an intermediate merge by merging the source branch and the tip of the destination branch and show differences between the intermediate merge and the tip of the source branch. Any changes suggested by reviewers to code are then made to this (theoretical) intermediate merged file and have to be propagated back to the source branch before the source branch can be merged with the destination branch.

These and other features of the claimed invention are described in detail in the following sections.

System Overview

FIG. 4 illustrates an SCM system 400 having an upstream repository with branches and a clone with other branches according to one embodiment. The SCM system 400 may comprise a server computer 402 coupled directly or indirectly through one or more networks 450 to one or more user computers 420, 440 and 442. The server computer 402 hosts an upstream repository 404 that stores source code 405 for a project or application. As an example, the source code 405 may comprise one or more branches 406, 408. In this context, a branch may refer to a named set of computer program code, typically a set related to a particular feature or function, such as a set of classes or methods.

Network 450 may comprise a local area network (LAN) of an enterprise in one embodiment; in this case, the SCM system 400 may be implemented as an on-premises solution in which the server computer 402 and user computers 420, 440 and 442 are associated with the same business enterprise and at least the server computer 402 is within an enterprise-controlled facility that is protected from open internetworks using firewalls or other security systems. In another embodiment, network 450 may represent a public internetwork and the server computer 402 may be located off-premises with respect to an organization involved in software development, such as in a shared data center or cloud computing facility.

User computer 420 and user computers 440, 442 each may host a clone repository 422 comprising a copy 425 of source code. The copy 425 generally duplicates the source code 405 of the upstream repository 404. The clone repository 422 may comprise one or more branches 424, 426 for use by a particular user of the user computer 420. In an embodiment, branches 424, 426 of clone 422 correspond respectively to branches 406, 408 of upstream repository 404. In this context, a first branch is a "corresponding branch" of a second branch when the second branch began as a copy of the first branch and then was subjected to one or more revisions, so that the first and second branch continue to correspond in content at least in part.

In addition, the server computer 402 hosts an SCM server 410, which comprises one or more application programs, libraries, APIs or other software elements that implement the features and functions that are further described herein. The SCM server 410 includes a pull request module 412, which is configured to generate and manage pull requests, receive suggested code changes from a pull request interface, manage suggested code changes, and apply the suggested code changes to the source code in the manner described further herein. User computers 420, 440 and 442 may host an SCM client 428 that includes complete implementations of functional logic for retrieving source code from the SCM system 410, creating forks/branches, editing source code, and generating requests to merge branches back into the upstream repository 404. The specific division of labor between the server 402 and the client 420 is not critical and may vary in different embodiments based upon performance tradeoffs and other factors.

In one implementation, the upstream repository 404 may be at server computer 402, and each of the user computers 420, 440, 442 hosts a local repository such as clone 422. Each repository on user computers 420, 440, 442 initially may be a complete clone of the upstream repository 404 after which changes in branches 424, 426 may be merged into corresponding branches 406, 408 of upstream repository 404.

The SCM server 410 may be coupled to a database 414 that is configured to store metadata relating to branches 406, 408 and other aspects of repository 404, such as data relating to each version of the upstream repository, and other project management data, and the like.

In a local implementation such as Bitbucket Server, the server computer 402 and user computers 420, 440, 442 are coupled to a LAN and/or WAN in the form of network 450 and are logically located behind a firewall or other security appliance; typically the computers are associated with one business enterprise or institution.

In another implementation, where the SCM system is provided by a shared remote data center, the SCM system 400 may be implemented using one or more server computing instances that are instantiated on or hosted in a shared data center or cloud computing infrastructure. Examples include Amazon Web Services, Rackspace, and private cloud data centers. There may be any number of server computing instances instantiated from time to time based upon the number of user computers 420, 440, 442 that access the instances, or other performance requirements.

In the remote data center implementation, the network 450 may represent at least one internetwork, such as the public internet, in combination with one or more wired or wireless LANs, WANs, or other network or access infrastructure such as cable modems, routers, etc.

In either the local or remote arrangements, the user computers 420, 440, 442 may include a browser 430 that is configured to request, render and display electronic documents that conform to a markup language such as HTML, XML or extensions, and is capable of internally executing browser-executable code 432 such as JAVASCRIPT, ACTIVE SERVER PAGES, or other forms of code. Thus, in this arrangement, aspects of functional logic of the SCM system 400 may be distributed to the user computers 420, 440, 442 as browser-executable code 432, where appropriate. However, the use of browser-executable code 432 is not required and other embodiments may deliver pure HTML to the browser 432 for rendering. Each user computer 420, 440, 442 may manage a local repository such as clone 422 based upon a MERCURIAL/GIT repository.

Example Process

Figure 5:
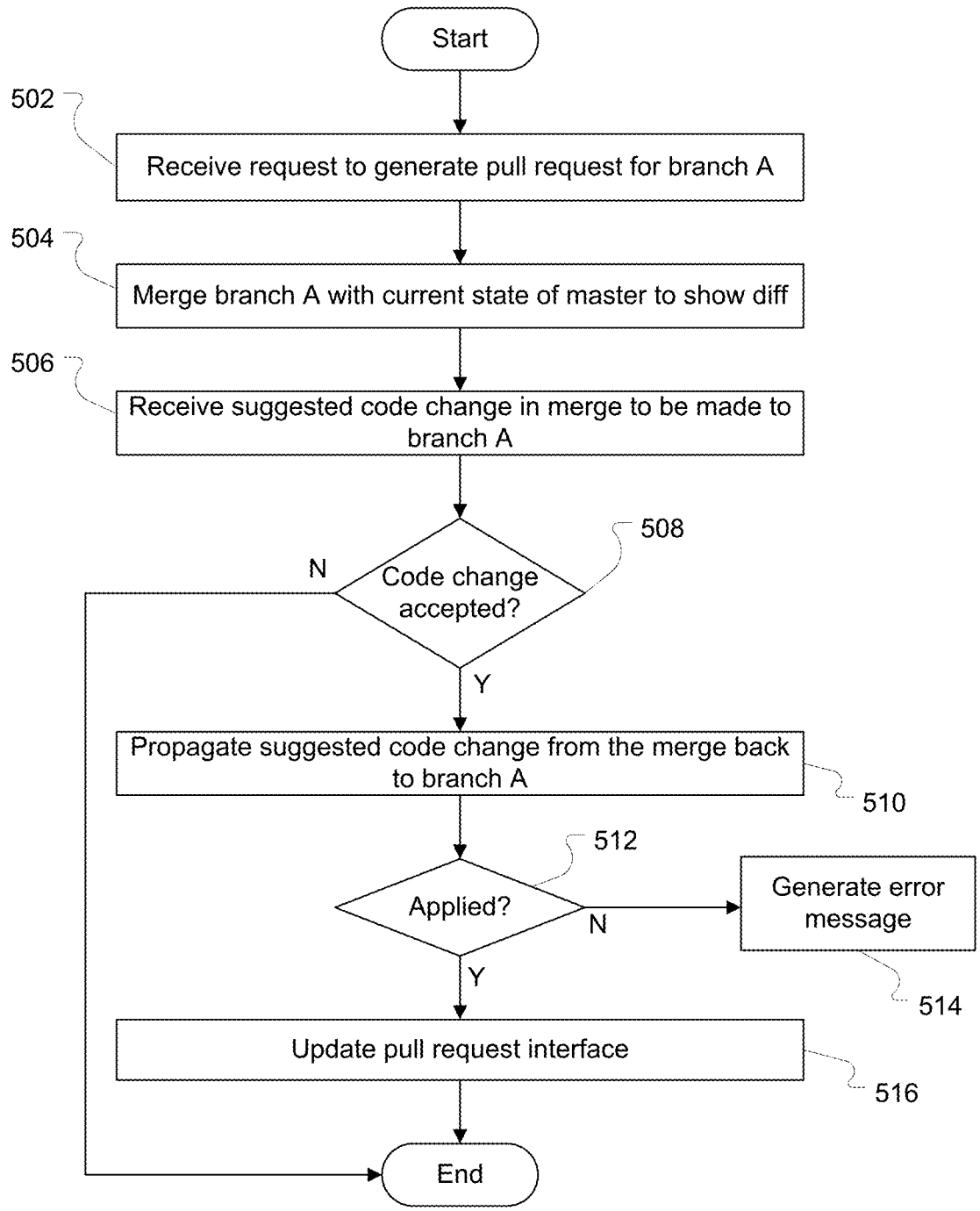
FIG. 5 illustrates a process for automatically applying a source code change via a pull request.

FIG. 5 illustrates an example process for automatically updating source code in SCM system 400 via a pull request. The method commences at step 502, where a request to generate a pull request is received. Typically, a developer (e.g., Alice) may be working on a piece of source code on her own computing device (e.g., user computer 420). To do this, Alice may create a fork (e.g., clone repository 422) of the main (master) repository 404 that has the main source code 405. She can then implement changes to her version of the source code 425, e.g., in branch 424 (also referred to as Alice's branch). These changes may include fixing bugs, adding a feature, deleting a redundant piece of source code, refactoring the source code, etc. Once Alice is happy with the changes, she may wish to merge these changes with the master source code 405 and specifically with branch 406. However, before the changes can be merged into the master branch, they need to be approved by one or more approvers. To this end, Alice submits a pull request to merge the changes she made in her branch with the master branch. In particular, Alice may select a "pull request" selectable affordance displayed in a user interface rendered by her browser 430, which communicates with the SCM System 410 and the Pull Request Module 412. When this is done, the pull request module 412 generates a pull request descriptor—this descriptor may include information such as a unique identifier for the pull request, a unique identifier of the requester, a unique identifier of the source repository and branch and a unique identifier for the destination repository and branch, and a status indicator of the pull request (e.g., whether it is open, updated, modified, closed, etc.). In some cases, the pull request descriptor may also include an indicator of the state of the tip of Alice's branch (e.g., a commit ID or hash value) and a list of participants (such as reviewers/approvers) for the pull request. The pull request descriptor may be submitted to the SCM server 410. The SCM server may store the received pull request descriptor in a database, such as database 414.

At step 504, the SCM server 410 creates a pull request from the pull request descriptor and forwards the pull request to the one or more participants listed in the pull request descriptor. Once a pull request is created, the reviewer(s) identified in the request or any user who has read permission for the destination repository can accept/reject/review the pull request. In an embodiment, to view a pull request, a reviewer navigates to the reviewer's repository and selects a PULL REQUESTS option in a navigation bar. In response, the reviewer's browser 430 displays a list of incoming pull requests in an OPEN panel. The reviewer may select Alice's pull request from this list. In response, the browser 430 is configured to cause displaying details of the pull request including the branches to be merged, and to automatically cause displaying a diff of the changes. The reviewer also may view details of the commits involved in the request, or comment activity relating to the request.

Figure 6:
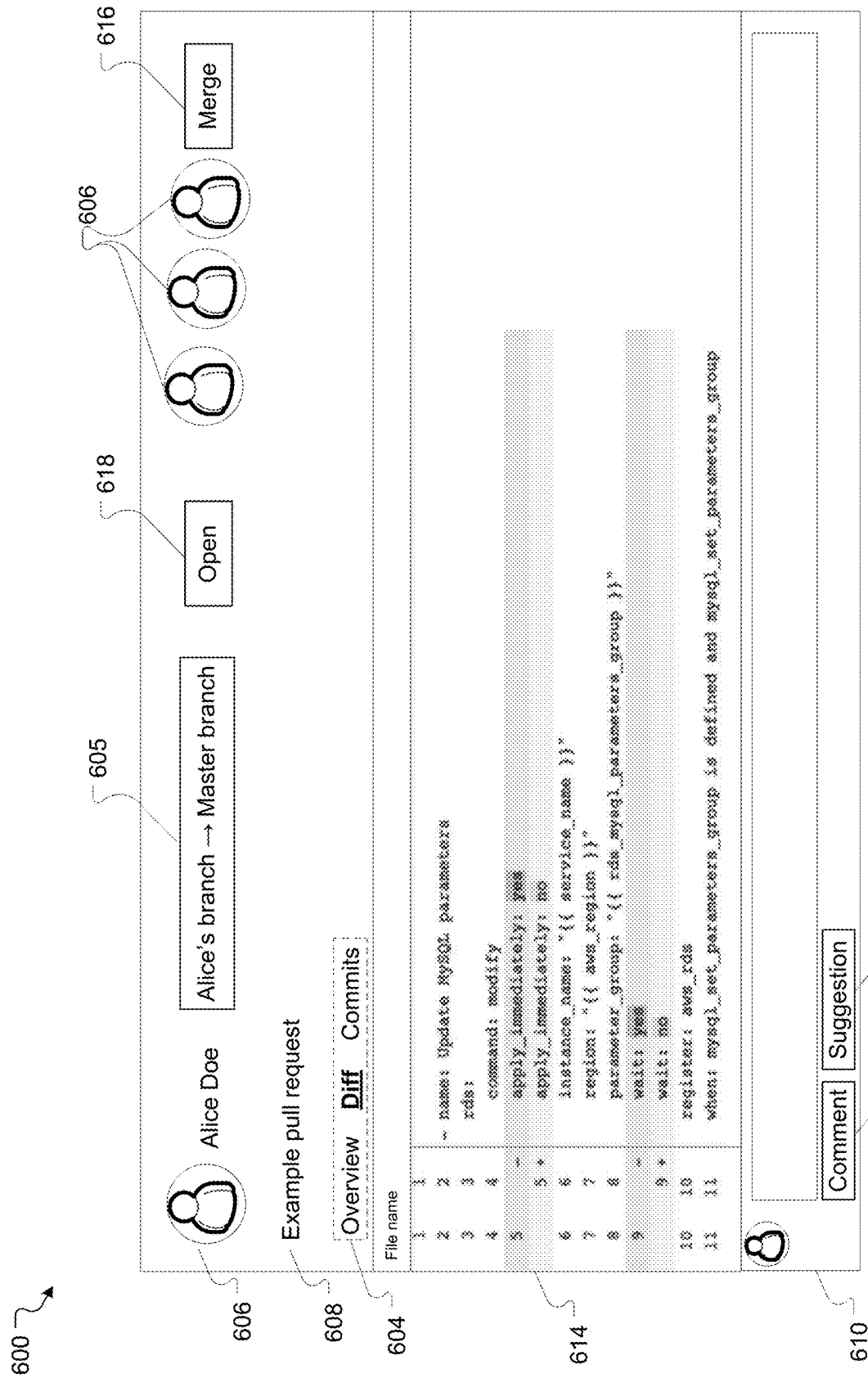
FIG. 6 illustrates an example user interface illustrating a diff tab of a pull request according to aspects of the present disclosure.

FIG. 6 illustrates an example pull request user interface illustrating a DIFF tab of the pull request. In particular, FIG. 6 shows an example view of an open pull request that a user has initiated. In an embodiment, the pull request UI 600 comprises a status identifier 618, a to-and-from line 605, a set of tabs 604 associated with different request contexts, a participants list 606, request details 608, a comments sub-panel 610, a code panel 614, and a set of action buttons 616. In an embodiment, the status identifier 618 is configured to indicate a then-current context of the pull request; in this case, the user is viewing a request that is open, so the status is OPEN. The to-and-from line 605 summarizes the merge to be performed by briefly identifying the source repository, source branch, destination repository, and destination branch. The tabs 604 associated with different request contexts may comprise a DIFF, COMMITS, and OVERVIEW tab. In the example of FIG. 6, the DIFF tab is selected to enable viewing a comparison of the commits to be merged.

In an embodiment, the participants list 606 indicates users who are associated with the pull request such as the requester and one or more approvers; in addition to a list of participants, in an embodiment, a set of explicit reviewers may be defined in association with a request. The comments sub panel 610 may indicate any comments previously entered by other users and is configured to (optionally) receive entry of a new comment from the current user. In an embodiment, action buttons 616 include MERGE, COMMENT and SUGGESTION options which, when selected, cause executing a merge specified in the pull request, permit the reviewer to add a comment, or permit the reviewer to make a code change suggestion, respectively.

The code panel 614 shows changes in the source code between the current state of the source branch and the current state of the destination branch. As this is not a simple diff—i.e., a diff between two versions of the source branch, but a diff between the tip of the source branch and the latest state of the master branch, an intermediate merge operation is performed to show this difference.

Figure 7:
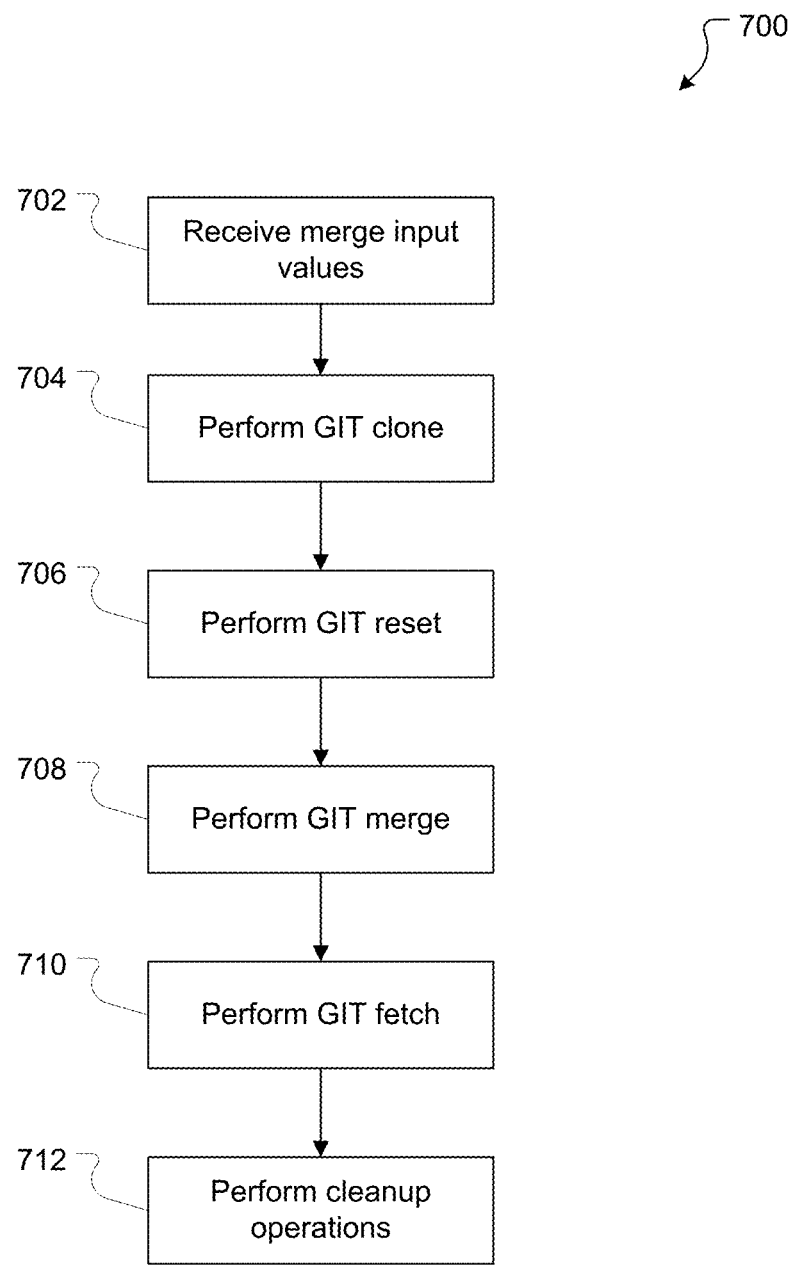
FIG. 7 is a flowchart illustrating an example process 700 for creating an intermediate merge file according to aspects of the present disclosure.

FIG. 7 is a flowchart illustrating an example process 700 for creating an intermediate merge. In one embodiment, the process 700 is implemented using the pull request module 412. At step 702, the pull request module 412 receives input values to perform the intermediate merge. In an embodiment, the following input values are received: identity of a source repository (e.g., repository 404) to merge from; identity of a destination repository (e.g., repository 404) to merge into; identity, such as a name and hash value, of a branch to merge into, termed the "to" branch (e.g., branch 406); identity of a branch to merge from, termed the "from" branch (e.g., branch 408); and a commit identifier. In this example, the source and destination repositories are the same repository (e.g., repository 404), but the branches are distinct branches of that repository (e.g., branches 406 and 408). In other examples, in addition to repository 404, the server computer 402 may include one or more other forked repositories and in such examples, the source repository in the example above can be one of these forked repositories. Additionally, as part of processing the merge, in this embodiment, a temporary directory is created on server 402 for storing a temporary GIT clone, and is used only for a single merge.

At step 704, the pull request module 412 invokes the SCM system 410 to perform a GIT clone operation. Performing the GIT clone operation involves cloning the to-branch into the temporary directory for working purposes. In one embodiment, the following GIT command may be used:

git clone --no-checkout --shared -b (to branch) (repository path) (temporary directory)

where, the to branch identifies the destination branch, repository path identifies a pathname of the repository of the "to' branch, and temporary directory identifies the temporary directory on the server 402. For this command, a system working directory is used as the working directory. The --no checkout option prevents the clone from populating a working copy with all files from the tip of the branch. After the cloning process completes, the working copy is empty aside from the *.git directory. Because some repositories have a large codebase, performing a full checkout in this manner can take up to several seconds depending on machine resources. The --shared option sets up a GIT alternatives file in the .git/objects/info directory. This file points to the objects directory of the origin repository, allowing the clone to use both loose and packed objects from the origin directly. The -b option sets HEAD to the desired branch for performing the merge.

At step 706, the pull request module 412 invokes the SCM system 410 to perform a GIT reset operation. The GIT clone operation with the --no-checkout option can cause files in the repository to be staged for deletion, which is undesirable as it could cause an unexpected subsequent deletion of important files. In an embodiment, step 706 resets the staged-for-deletion markings so that all such files are unstaged for deletion. The following command may be used:

git reset --quiet (to hash)--

The temporary directory for the clone is used as the working directory for this command. In an embodiment, the to hash value may be provided. Alternatively, the to hash value may not be included in the GIT reset command. In case the hash value is not provided, the from-branch would be merged into the to-branch at the current tip revision of the target branch.

At block 708, the process performs a GIT merge operation. With the temporary clone ready, the merge may be performed using the following command:

git merge --log --no-ff --quiet -m (commit message) (from hash)

The temporary directory for the clone is used as the working directory for this command. In this command, the --log option includes the summaries from the most recent commits, such as up to the last 20 commits, which are included based upon the from hash value and not already on the to-branch. The --no-ff option ensures that an intermediate merge commit is created even when the from-branch is a descendant of the to-branch. This approach is useful because the system stores the merge commit for the pull request.

Figure 3A:
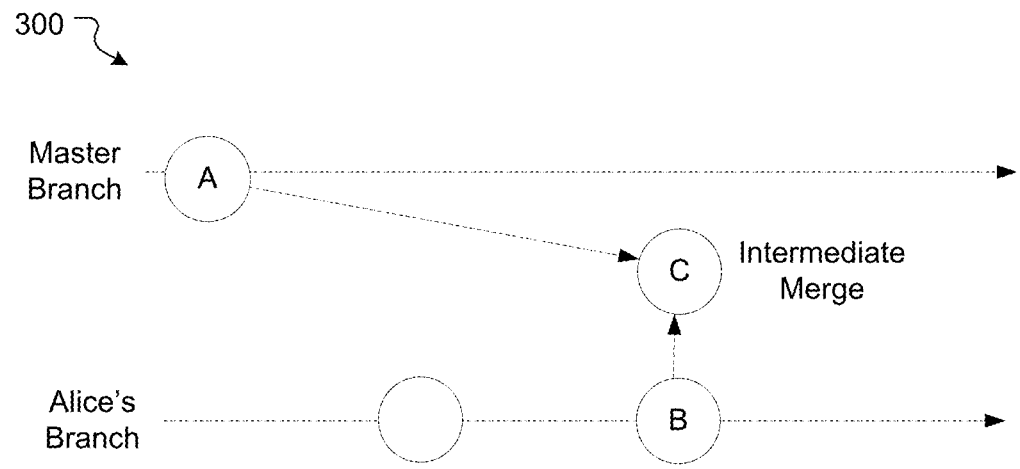
FIG. 3A illustrates an example intermediate merge.
Figure 3B:
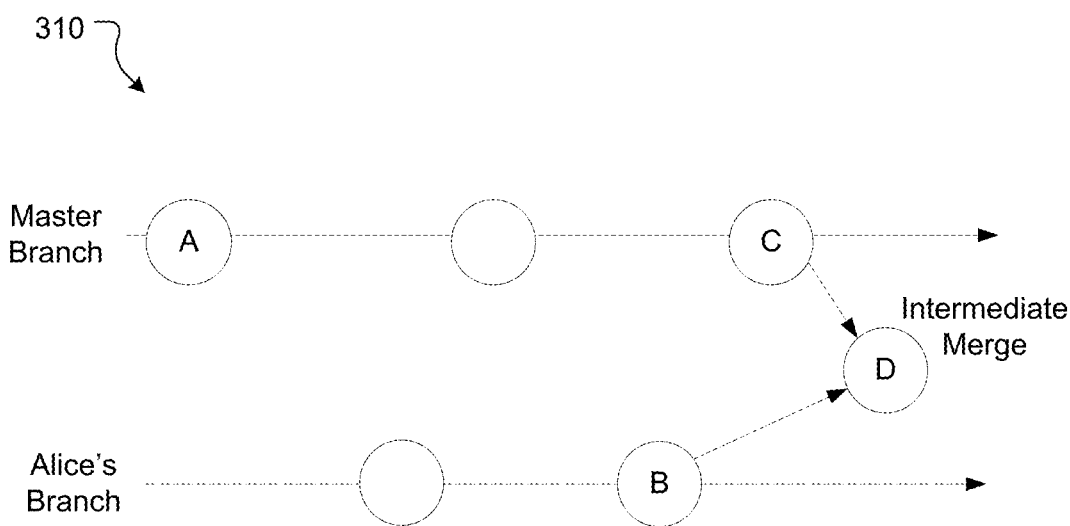
FIG. 3B illustrates another example intermediate merge.

FIGS. 3A and 3B illustrate two example intermediate merges that can be generated by process 700. In FIG. 3A, A depicts the state of the master branch when Alice forked from the master to create her own branch and B depicts the state of the tip of Alice's branch. In this case, process 700 creates an intermediate merge C that includes the changes that were made from state A to state B. Since Alice's branch was created from A, this is effectively the same as showing the changes made in going from state A to state B, but in a single step.

In FIG. 3B, the master branch has changed since Alice forked from the master branch—it is now at state D. Now, when Alice creates a pull request, process 700 creates an intermediate merge E between the tip of Alice's branch (B) and the tip of the master branch (D). Accordingly, the intermediate merge E incorporates the changes that were made from A to D on the master branch and the changes that were made from A to B on Alice's branch.

In one embodiment, the process 700 may be implemented in the remote shared data center context in a manner that is similar to the foregoing description, but the creation of a clone repository is not required. In this case, the merge of the source branch with the destination branch is simulated in memory without the use of files on disk and without the use of a separate or temporary clone of the repository. Thus, in this implementation, an intermediate merge can be created in a single repository, without use of the resources involved in checking out the repository.

In such an embodiment, using GIT repositories, a temporary tree as a temporary holding location for the files to be merged or index of files to be committed may be used. A temporary index is created to record the changes to be committed and thus to represent an intermediate merge commit, for which a diff is shown. In an embodiment, the temporary index and temporary tree are stored in non-volatile, non-memory storage, such as disk storage.

In certain embodiments, when merging the source and destination branches, the pull request module 412 may highlight changes between the source and destination branches. For example, lines of code that are added by Alice may be highlighted in green and lines of the code that have been deleted from the tip of the master branch (either by Alice or by other developers) may be highlighted in red. Additionally, if any lines of code conflict between Alice's branch and the latest state of the master branch, these lines of code may be highlighted in orange to highlight the conflict. FIG. 8 illustrates an example code panel 800 that illustrates added lines (e.g., line 28), deleted lines (e.g., line 20), and conflicting lines (lines 53-60).

Returning to method 500, once the intermediate merge is created, the resulting merged source code is depicted in the code panel 614 of the pull request interface (e.g., pull request interface 600).

Next, at step 506, the SCM server 410 may receive a suggested code change request via the pull request interface 600.

In certain embodiments, a participant of the pull request (e.g., a reviewer) may suggest one or more changes to the source code in the pull request at this step. This participant is referred to as a suggesting user in this disclosure. To this end, the suggesting user may select a line in the source code in the code panel 614 and then select the SUGGESTION action button 616. In certain embodiments, selection of the SUGGESTION action button causes the pull request module 412 to automatically add suggestion syntax in the comment dialog. Further, the selected source code line is also automatically added to the suggestion syntax. The suggesting user can then amend the selected source code line in the comment dialog and save this suggestion.

Figure 9:
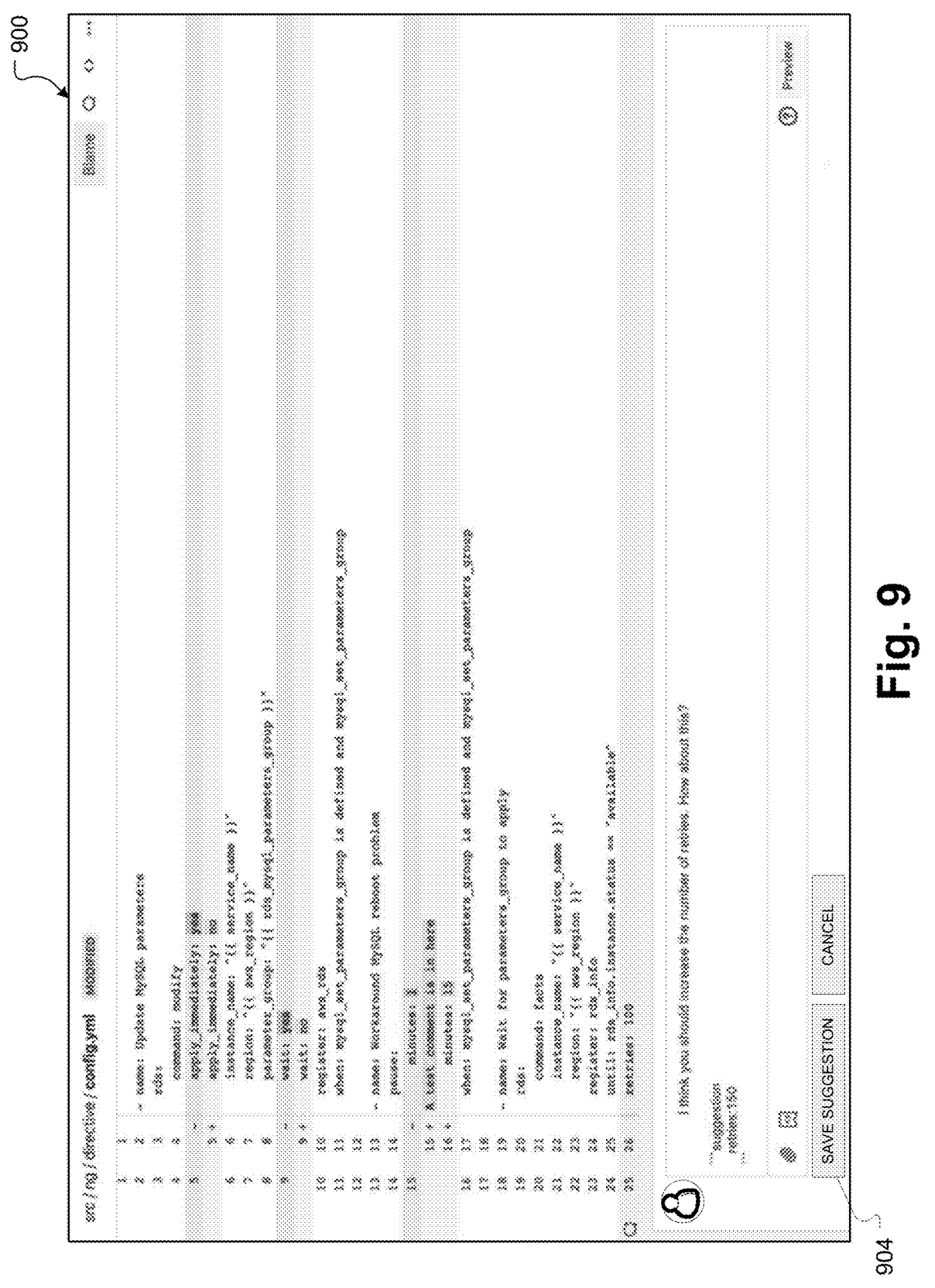

FIG. 9 illustrates an example pull request interface 900, where a suggesting user has selected source code line 25-26 "retries: 100" from the code panel 614, entered a comment, "I think you should increase the number of retries. How about this?" and then selected the SUGGESTION action button 616. This resulted in the pull request module 412 automatically adding the suggestion syntax, "'SUGGESTION RETRIES: 100'" in the comment dialog under the suggesting user's comment. The suggesting user then amended the number of retries in the suggestion syntax from "100" to "150". A SAVE SUGGESTION action button 904 may also be displayed once the suggesting user begins amending the suggestion syntax.

In certain embodiments, at this stage, the pull request module 412 may compare the suggested source code line with the originally selected source code line to determine if the suggesting user has made a change. If no change is detected (e.g., because the original and updated source code lines match), the SAVE SUGGESTION action button 904 may be inactivated and/or an error message may be displayed when the suggesting user attempts to save the suggestion.

In addition or alternatively, at this stage, the pull request module 412 may also determine whether the suggestion syntax (other than the source code line) has been tampered. For example, if the suggesting user accidently changes or deletes other parts of the suggestion syntax, the SAVE SUGGESTION action button 904 may be inactivated and/or an error message may be displayed when the suggesting user attempts to save the suggestion.

Once the suggesting user is happy with the code change suggested in the dialog box and if the SAVE SUGGESTION action button 904 is enabled, the suggesting user may save the suggested code change (e.g., by selecting the SAVE SUGGESTION action button 904).

This may result in the pull request module 412 creating a record of the suggestion. The record may include a unique suggestion identifier, an identifier of the parent comment (in which the suggestion is embedded), a status of the suggestion (e.g., unapplied, applied, error in applying, ignored, etc.), the corresponding pull request identifier, and/or an identifier of the suggesting user. This suggestion record may be forwarded to the pull request module 412, which stores the suggestion record in a suggestion record data structure or against the corresponding pull request descriptor.

Figure 10:
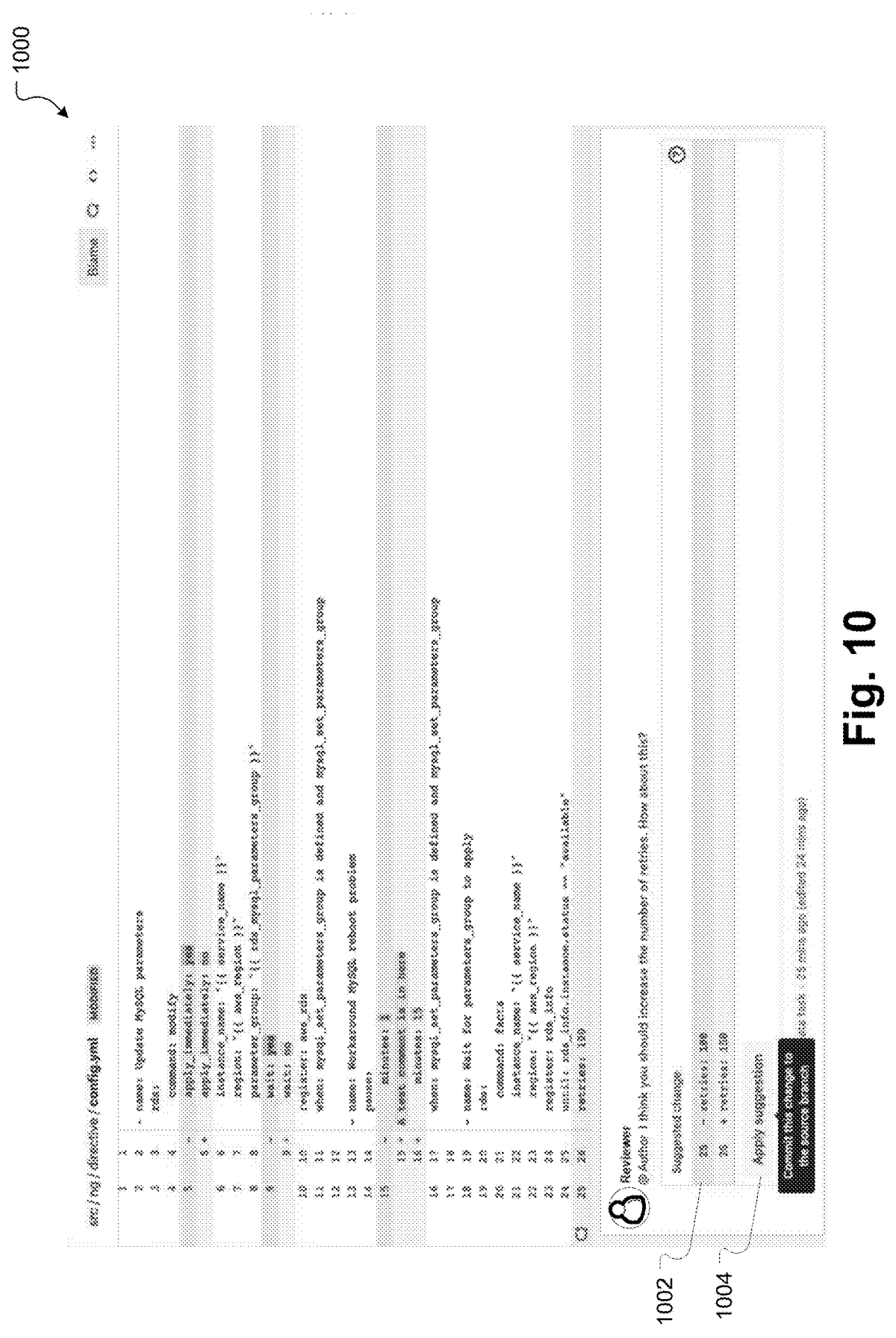

In addition to creating and forwarding the suggestion record, the pull request module 412 may update the comment subpanel 610 to show a suggestion markup user interface within the comment subpanel 610 along with an APPLY SUGGESTION action button. This is illustrated in the pull request interface 1000 depicted in FIG. 10. For example, see suggestion markup user interface 1002 which depicts the source code line to be deleted (e.g., line 25, retries: 100) in red and the suggested source code line to be added (e.g., line 25, retries 150) in green. It will be appreciated that once a suggesting user adds a suggested source code change in this manner, the suggestion markup user interface may be displayed in the pull request user interface of all the participants involved in that pull request—e.g., the author, other reviewers, and/or anyone with edit permission to the source branch (e.g., Alice's branch) when such participants access the pull request.

Returning to FIG. 5, once the suggestion is submitted and displayed in the pull request user interface 1000, the pull request module 412 determines whether the suggestion has been accepted (at step 508).

Any user, e.g., the author, any other reviewer, and/or any person with edit permissions to the source branch can accept the suggested source code change. This user is referred to as an accepting user in this disclosure. In certain embodiment, accepting the source code change suggestion involves selecting the APPLY SUGGESTION action button 1004. If a suggestion has been accepted (e.g., because a user has selected the apply suggestion action button), the pull request module 412 generates a new commit message and the process 500 proceeds to apply the suggested change in the intermediate merge to the underlying source code and in particular to the source code in the source branch (e.g., Alice's branch).

It will be appreciated that the source code lines shown in the DIFF tab of the pull request is based on the intermediate merge between the tip of the source branch and the latest state of the target branch. It is not a diff showing only the changes made by Alice when she forked from the master branch. Accordingly, the source code lines shown in the DIFF tab may not directly correspond with the source code lines in Alice's branch. Further, Alice may have made further changes to her branch after the pull request was created. Therefore, the suggested code change cannot be applied to the source branch in a simple manner. Instead, a complex process is employed to determine how the source code lines in the intermediate merge correspond with the source code lines in Alice's branch and then apply the suggested change if the corresponding lines can be identified in Alice's branch.

Figure 11:
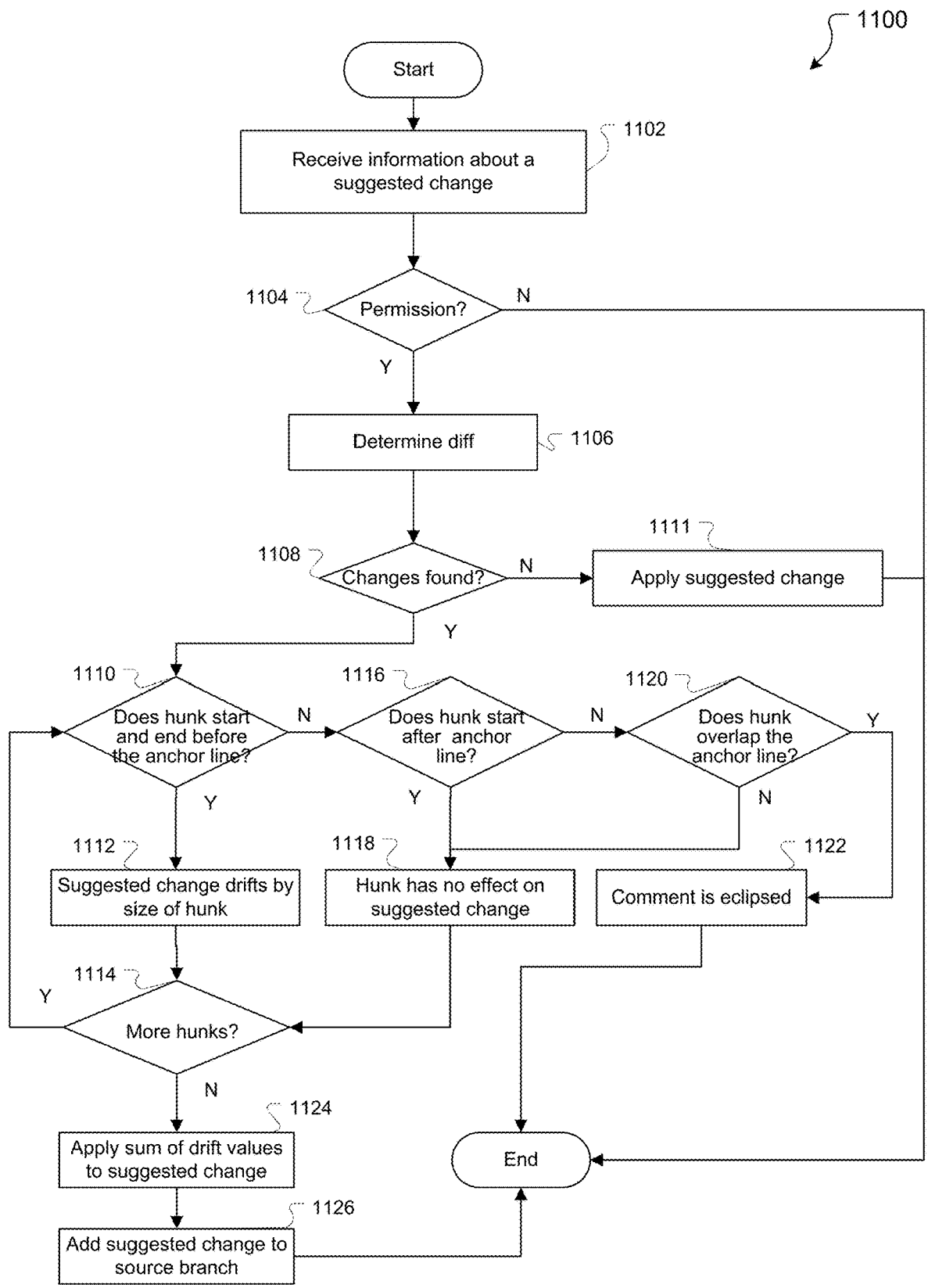
FIG. 11 is a flowchart illustrating an example process for applying the suggested change to the source branch.

In certain embodiments, to apply the suggested change to the source branch, the pull request module 412 follows the process depicted in FIG. 11.

The method 1100 begins at step 1102 where the pull request module 412 receives information about a suggested change. For instance, the pull request module 412 may receive a comment identifier and a commit message associated with the suggested change. In addition, the pull request module 412 may receive an identifier of the applying user, the line number of the source code in the intermediate merge to which the suggested change is anchored (e.g., the source code line selected by the suggesting user at step 506) and the text of the suggested change. Some or all of this information may be retrieved from the suggestion record and/or the pull request user interface.

At step 1104, the pull request module 412 determines whether the accepting user has permission to apply the suggested changes. In certain embodiments, the pull request module 412 may retrieve the permissions associated with the source repository and compare the user identifier of the accepting user with the user identifiers of all the users that have write permission to the source branch. If at step 1104, it is determined that the accepting user does not have write permissions to the source branch, the pull request module 412 may generate an error message, e.g., indicating that the accepting user does not have sufficient permissions to apply the suggested code change, and the method 1100 may end.

Alternatively, if the pull request module 412 determines that the suggesting user has permission to write to the source branch, the pull request module 412 attempts to add the suggested change to the source branch. In order to calculate where to add the suggestion, the method 1100 calculates the difference between the version of the file that is displayed to the user and the version that is on the source branch in step 1106. If the suggestion is on a line added by the source branch, step 1106 calculates the difference from the intermediate merge to the source branch. Alternatively, if the suggestion is on a line that is unchanged by the source branch, step 1106 calculates the difference from the destination branch to the source. In both cases, the calculated difference (or "diff") is used in further steps. When calculating the diff, the pull request module 412 may retrieve the commit identifiers of the tip of the source branch, the tip of the destination branch and/or the intermediate commit identifier associated with the intermediate merge.

In step 1108, the pull request module 412 determines if any changes exist in the calculated diff. If at this step it is determined that the diff contains no changes, the pull request module determines that the source code line numbers in the intermediate merge directly correspond with the source code line numbers in the source branch and the method directly proceeds to step 1111 where the pull request module 412 proceeds to replace the selected source code line with the newly suggested source code.

Alternatively, if at step 1108, one or more changes (also called 'hunks') are identified in the diff calculated at step 1106, the pull request module 412 determines that the source code lines numbers in the intermediate merge do not directly correspond with the source code line numbers in the source branch and determines where to insert the new suggested source code line.

In particular, at step 1110, the pull request module 412 determines whether a selected hunk starts and finishes before the source code line to which the suggested change is anchored. If it is determined at this step that the suggested change is anchored to a line that is after the end of the selected hunk, the method proceeds to step 1112 where the pull request module determines how much the suggested change drifts for the given hunk by subtracting the number of lines in the intermediate merge side of the hunk from the number of lines in the source branch side of the hunk.

Next, at step 1114 a determination is made whether more hunks exist. If one or more unprocessed hunks exist, the method returns to step 1110 where the pull request module 412 considers the next hunk. If no more hunks exist, the method proceeds to step 1124.

Returning to step 1110, if at this step for any of the processed hunks the pull request module 412 determines that the selected hunk does not start and finish before the line that the suggested change is anchored to, the method proceeds to step 1116 where a determination is made whether the selected hunk starts after the line to which the suggested change is anchored. If at this step, a position determination is made (i.e., that the selected hunk starts after the line to which the suggested change is anchored, the pull request module 412 determines that the hunk has no effect on the suggested change at step 1118 and the method proceeds to step 1114.

Alternatively, if at step 1116, it is determined that the hunk does not start after the line to which the suggested change is anchored, the method proceeds to step 1120 where a determination is made whether the selected hunk overlaps the line to which the comment is anchored. If at this step it is determined that the selected hunk does overlap the line to which the comment is anchored, the method proceeds to step 1122 where the pull request module 412 determines that the hunk eclipses the line to which the comment is anchored. In this case, the suggestion cannot be applied and the method 1100 ends.

On the other hand, if at step 1120 it is determined that the hunk does not overlap the line the comment is anchored to, then the method proceeds to step 1114.

Returning to step 1114, if at this step it is determined that no more unprocessed hunks exist, the method proceeds to step 1124.

At step 1124, the drift values that were determined at step 1112 are applied to the line numbers associated with the suggested change, effectively adjusting the position associated with the suggested change to the correct line number range. Further, the results of the process at this point are summed for each hunk, resulting in determining a final drift value for the suggested change.

At step 1126, the new line number is determined by subtracting the drift value from the original line number (in the intermediate merge) and the new suggested change is added in the source code in Alice's branch immediately after the new line number.

For purposes of illustration, process 1100 was described where the hunks corresponded to lines added to the source code in the intermediate merge but were not present in the source branch when the pull request was generated, but similar techniques may be used to adjust for drift in the case of removed lines.

At the end of process 1100, control returns to process 500 and in particular to step 512, where the pull request module 412 determines whether the suggested change was applied to the source branch or not. If it is determined that the suggested change could not be applied to the source branch, e.g., because the line was changed and/or removed in the source branch and/or the suggesting user does not have permission to apply the suggestion, the pull request module 412 may be configured to generate an error signal and transmit this error signal to the browser 430 of the accepting user at step 514. The browser 430 can then render an error message in the pull request interface 1000 notifying the user that the suggested change cannot be implemented. In some embodiments, the same error signal may be generated for all types of failures. In other embodiments, the pull request module 412 may generate different types of error messages, such that the browser 430 can render error messages that inform the suggesting user of the underlying problem—e.g., that the suggestion could not be applied because of insufficient permission, because the line that the suggestion is anchored to is removed from the source branch, or because the line that the suggestion is anchored to is changed in the target or destination branch.

Figure 12:
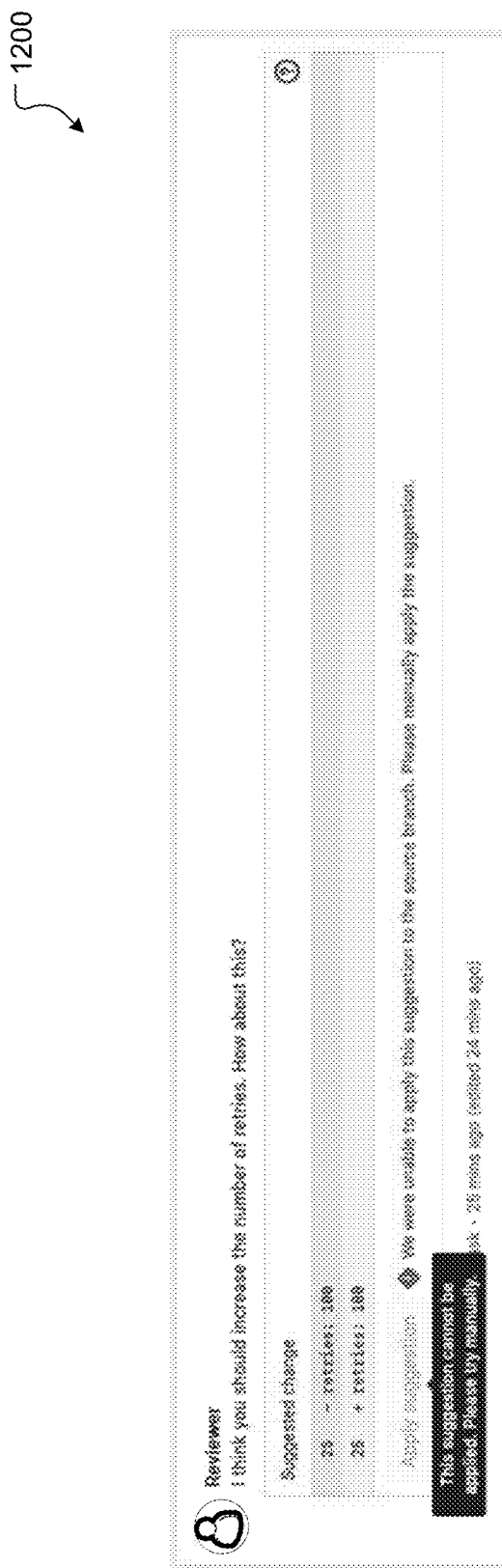
FIG. 12 illustrates an example pull request interface showing an error message.

FIG. 12 illustrates an example pull request interface 1200 showing an error message 1202 when a suggesting user applies a suggestion made in the pull request.

Alternatively, if at step 512 it is determined that the suggested change was applied to the source branch, the pull request module 412 may transmit a success signal to the browser 430 of the accepting user. Based on this success message, the browser 430 refreshes the pull request interface 1000 and shows the updated diff in the DIFF tab of the pull request (i.e., along with the applied code change) at step 516. Further, the comment subpanel may be removed and the previous/new line may be highlighted in red and green respectively. Further still, in certain embodiments, the status identifier of the pull request may be changed to UPDATED/MODIFIED and an indicator may be displayed (either permanently or briefly) to notify the suggesting user that their suggestion has been applied to the pull request.

Figure 13:
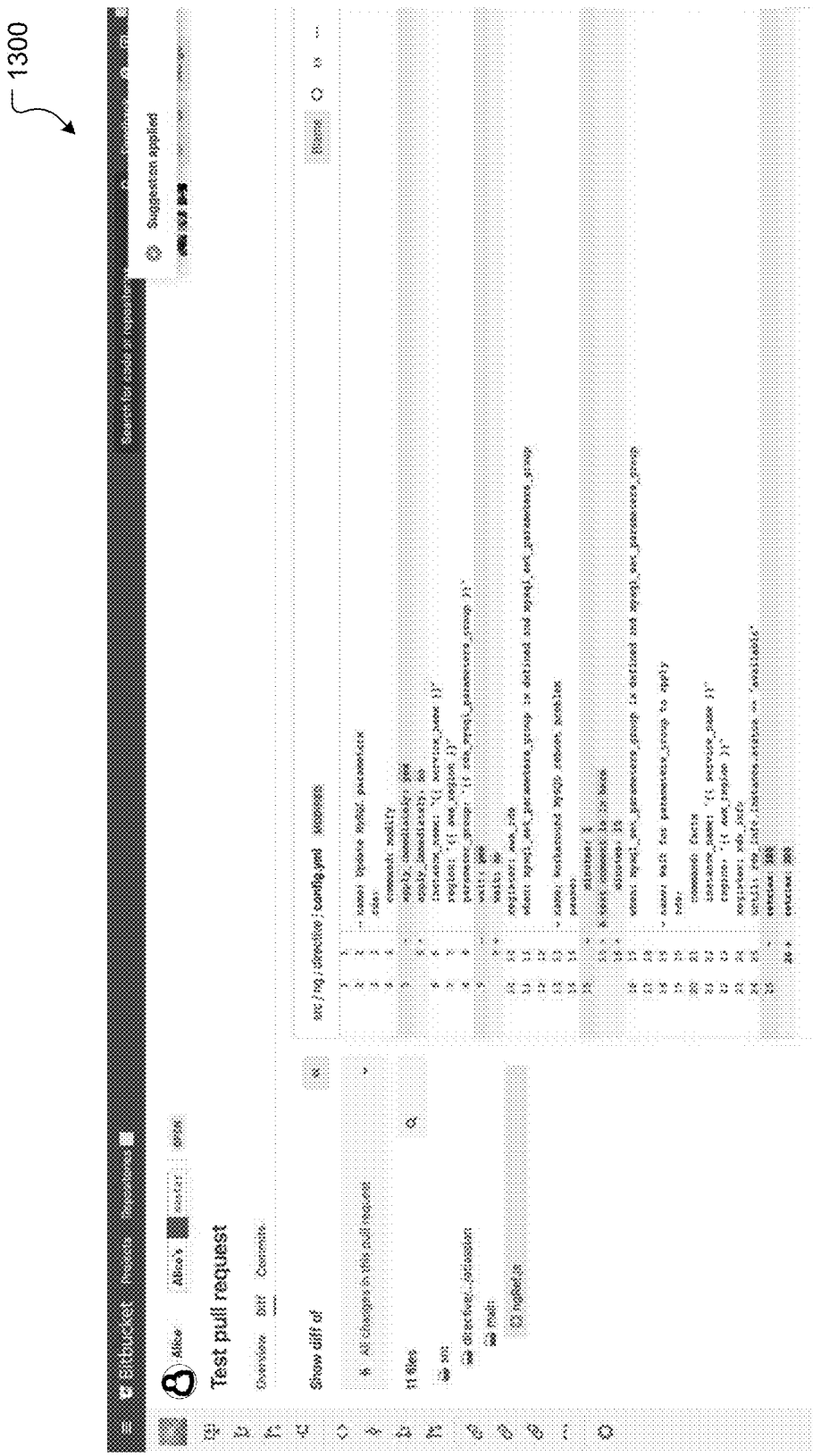
FIG. 13 illustrates an example pull request interface after a suggested change is applied.

FIG. 13 illustrates an example pull request interface 1300 after the suggested change has been applied to the source branch.

FIGS. 5-13 have been described with reference to a single suggestion being made in a pull request comment. However, it will be appreciated that users may make multiple such suggestions repeatedly, and the user interfaces and processes described above can be repeated for each of the successive suggestions.

In addition, in some cases, users may make multiple suggestions at the same time with respect to the same line of source code. In this case, an accepting user may select any one of the multiple suggestions.

In this case, before saving a suggestion, the suggesting user can add other suggestions via the comment dialog, e.g., either by adding additional suggestion syntax or by selecting the SUGGESTION action button multiple times. In the latter case, each time the SUGGESTION action button is selected, the browser 430 may update the pull request interface to add a new suggestion syntax, which the user can amend.

Figure 14:
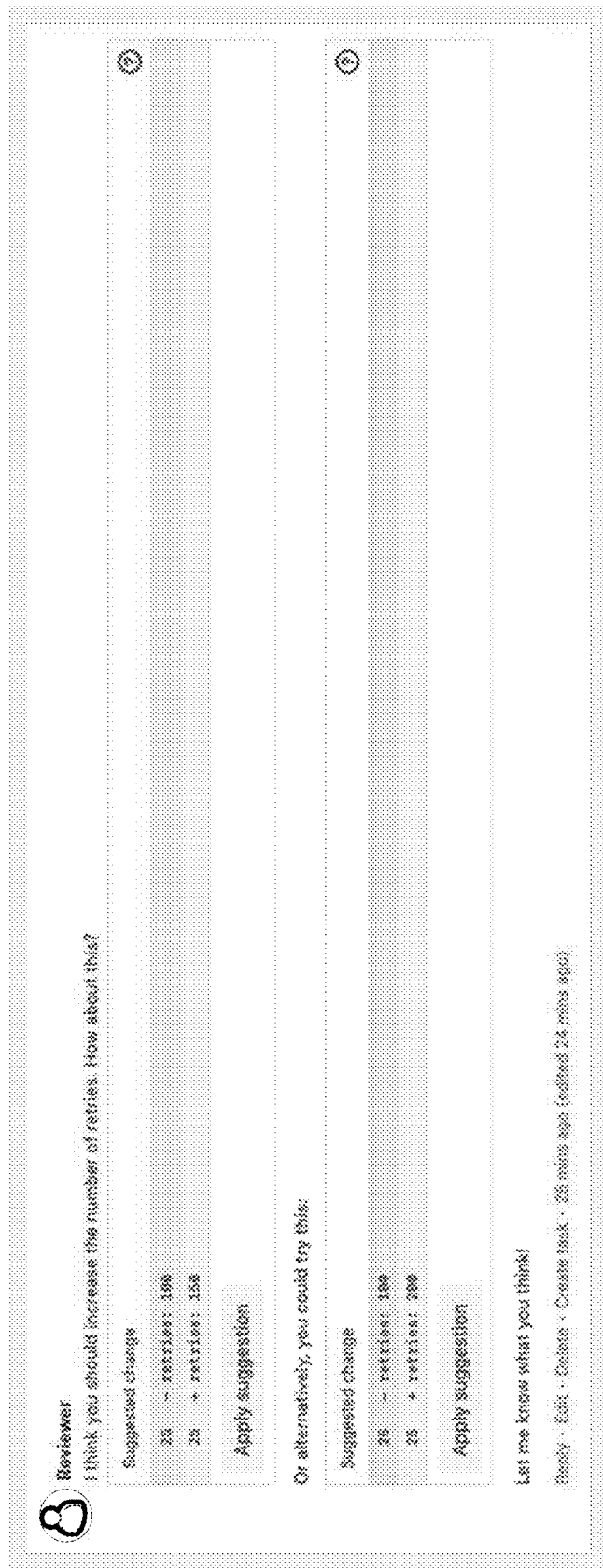
FIG. 14 illustrates an example comment subpanel of a pull request interface with multiple suggestions.

FIG. 14 illustrates a pull request user interface 1400 after a suggesting user saves a comment that includes multiple suggestions. This example extends from the previous examples where it was suggested that the number of retries in a source code be increased from 100 to 150. In the example depicted in FIG. 14, the suggesting user provides two alternatives, increasing the retries from 100 to 150 or from 100 to 200. Each of the suggestions includes its own APPLY SUGGESTION action button and an accepting user may select any one of these suggestions to apply.

Once either one of these suggestions is applied in the source branch source code (e.g., by following method 1100), the pull request user interface and especially the OVERVIEW tab may be updated to indicate which suggestion was applied (e.g., by displaying an 'applied' indicator next to that suggestion and/or by greying out the suggestion that was not applied).

In the case of multiple suggestions, the pull request module 412 may create suggestion records for each of the multiple suggestions separately. These records may be updated once a suggestion is applied, such that the status of one of the suggestion in the records indicates that the suggestion was applied, and the status of the other suggestions that were part of the multi-suggestion indicate that the suggestions were ignored and/or are outdated.

By maintaining a record of the suggestions made via pull request, the pull request module 412 can track these suggestions. For example, via their browser 430, a developer may select to view all unapplied or pending suggestions for which the developer may qualify as an accepting user. Through this interface, the developer may then apply suggestions in bulk.

In the foregoing description, reviewers are allowed to make suggested changes to source code via pull requests and in particular via the comments subpanel. However, such suggested changes may not be permitted in all instances. For example, users may not be permitted to make suggestions via all types of comment subpanels. In one instance, users may not be permitted to make suggestions without selecting a code line. Similarly, users may not be permitted to make suggestions if the user is not in a "full diff" mode (i.e., if they are not viewing a diff of the tip of the source branch with the tip of the target branch). In all of these cases, the SUGGESTION action button may be disabled, e.g., by greying out or removing from the user interface.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 15:
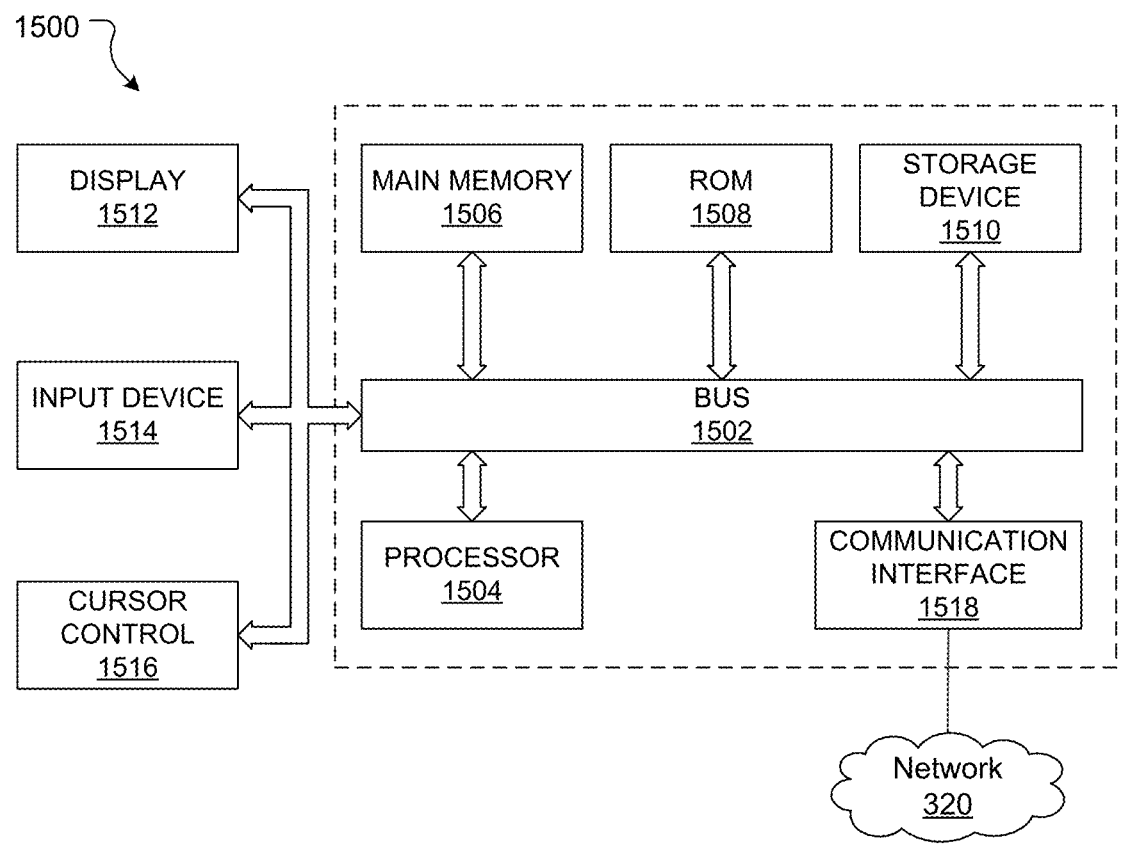
FIG. 15 illustrates a computer system with which various embodiments may be used.

For example, FIG. 15 is a block diagram that illustrates a computer system 1500 upon which an embodiment of the invention may be implemented. Computer system 1500 includes a bus 1502 or other communication mechanism for communicating information, and a hardware processor 1504 coupled with bus 1502 for processing information. Hardware processor 1504 may be, for example, a general-purpose microprocessor.

Computer system 1500 also includes a main memory 1506, such as a random access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. Such instructions, when stored in non-transitory storage media accessible to processor 1504, render computer system 1500 into a special-purpose machine that is customized to perform the operations specified in the instructions.

Computer system 1500 further includes a read only memory (ROM) 1508 or other static storage device coupled to bus 1502 for storing static information and instructions for processor 1504. A storage device 1510, such as a magnetic disk or optical disk, is provided and coupled to bus 1502 for storing information and instructions.

Computer system 1500 may be coupled via bus 1502 to a display 1512, such as a cathode ray tube (CRT), for displaying information to a computer user. An input device 1514, including alphanumeric and other keys, is coupled to bus 1502 for communicating information and command selections to processor 1504. Another type of user input device is cursor control 1516, such as a mouse, a trackball, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

Computer system 1500 may implement the techniques described herein using customized hard-wired logic, one or more ASICs or FPGAs, firmware and/or program logic which in combination with the computer system causes or programs computer system 1500 to be a special-purpose machine. According to one embodiment, the techniques herein are performed by computer system 1500 in response to processor 1504 executing one or more sequences of one or more instructions contained in main memory 1506. Such instructions may be read into main memory 1506 from another storage medium, such as storage device 1510. Execution of the sequences of instructions contained in main memory 1506 causes processor 1504 to perform the process steps described herein. In alternative embodiments, hardwired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1510. Volatile media includes dynamic memory, such as main memory 1506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise bus 1502. Transmission media can also take the form of acoustic or light waves, such as those generated during radio wave and infrared data communications.

Various forms of media may be involved in carrying one or more sequences of one or more instructions to processor 1504 for execution. For example, the instructions may initially be carried on a magnetic disk or solid-state drive of a remote computer. The remote computer can load the instructions into its dynamic memory and send the instructions over a telephone line using a modem. A modem local to computer system 1500 can receive the data on the telephone line and use an infrared transmitter to convert the data to an infrared signal. An infrared detector can receive the data carried in the infrared signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to network 320. For example, communication interface 1518 may be an integrated services digital network (ISDN) card, cable modem, satellite modem, or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic, or optical signals that carry digital data streams representing various types of information.

Computer system 1500 can send messages and receive data, including program code, through the network(s) 320, and communication interface 1518. In the Internet example, server 310 might transmit a requested code for an application program through network 320, and communication interface 1518. The received code may be executed by processor 1504 as it is received, and/or stored in storage device 1510, or other non-volatile storage for later execution.

A computer system as described herein may be configured in a plurality of useful arrangements. In one approach, a data processing method comprises using a server computer, obtaining from one or more non-transitory computer-readable data storage media a copy of one or more sequences of instructions that are stored on the media and which when executed using a particular user computer among a plurality of user computers cause the particular user computer to perform, using the particular user computer alone or in combination with the server computer, the techniques that are described herein; and using the server computer, downloading the copy of the one or more sequences of instructions to any user computer among the plurality of user computers.

In another approach, a computer system comprises a server computer comprising one or more non-transitory computer-readable data storage media stored with one or more sequences of instructions which when executed using a particular user computer among a plurality of user computers cause the particular user computer to perform: using the particular user computer, alone or in combination with the server computer, the techniques that are described herein; and in the server computer, stored downloading instructions which, when executed using the server computer, cause downloading a plurality of copies of the one or more sequences of instructions to the plurality of user computers.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage, or attribute that is not expressly recited in a claim should limit the scope of such claim in any way. The specification and drawings are, accordingly, to be regarded in an illustrative rather than a restrictive sense.

The invention claimed is:

1. A computer-implemented method for automatically updating source code in a first source code branch using a pull request user interface, the method comprising:
displaying, on a display of a user computing device, the pull request user interface associated with the first source code branch and associated with a pull request to merge the first source code branch into a second source code branch, the pull request user interface comprising:
a panel displaying source code associated with an intermediate merge between a tip of the first source code branch and a tip of the second source code branch and a code change suggestion; and
a selectable affordance associated with the code change suggestion to accept the code change suggestion; wherein the code change suggestion includes an original line of source code from the intermediate merge to be changed and a new line of source code suggested by a user via the pull request user interface to replace the original line of source code;
receiving user input on the selectable affordance associated with the code change suggestion;
propagating a source code change from the intermediate merge to the first source code branch such that an original line of source code in the first source code branch that corresponds to the original line of source code from the intermediate merge is replaced with the new line of source code as suggested by the user; and upon successfully propagating the source code change to the first source code branch, updating the pull request user interface associated with the first source code branch to indicate that the code change suggestion is applied and the pull request is modified.

2. The computer-implemented method of claim 1, wherein propagating the source code change from the intermediate merge to the first source code branch comprises:

determining whether the original line of source code from the intermediate merge is a source code line that is added by the first source code branch;

upon determining that the original line of source code from the intermediate merge is the source code line that is added by the first source code branch, calculating a difference from the intermediate merge to the first source code branch;

upon determining that the original line of source code from the intermediate merge is a source code line that is unchanged by the first source code branch, calculating a difference from the tip of the second source code branch to the first source code branch; and saving the calculated difference.

3. The method of claim 2, further comprising determining whether any changes are identified in the difference.

4. The method of claim 3, further comprising:

identifying a line number associated with the original line of source code in the intermediate merge;

determining that the line number of the original line of source code from the intermediate merge directly corresponds with a line number of a corresponding line of source code in the first source code branch if no changes are identified in the difference; and applying the code change suggestion by replacing the source code on the line number in the first source code branch with the new line of source code.

5. The method of claim 3, further comprising:

identifying a line number associated with the original line of source code in the intermediate merge and assigning this line as an anchor line;

determining that the line number of the original line of source code from the intermediate merge does not directly corresponds with the line number of a corresponding line of source code in the first source code branch if changes are identified in the difference; and determining a difference between the line number of the original line of source code in the intermediate merge and the line number of the corresponding line of source code in the first source code branch; and drifting the source code in the first source code branch by a number of lines corresponding to the difference between the line number of the anchor line and the corresponding line of source code in the first source code branch and replacing the source code on that line number with the new line of source code.

6. The method of claim 5, wherein determining the difference between the line number of the original line of source code in the intermediate merge and the line number of the corresponding line of source code in the first source code branch includes:

retrieving the changes identified in the difference, wherein the changes include a plurality of hunks;

for each hunk:

automatically computing a drift value representing a number of lines of the source code by which the anchor line has changed with respect to the first source code branch; and updating the anchor line number based upon the drift value; and repeating the computing and updating steps for all other hunks.

7. The method of claim 6, further comprising automatically computing the drift value by:

determining whether a hunk of the plurality of hunks starts and finishes before the anchor line;

determining the drift value as a size of the hunk in the first source code branch.

8. The method of claim 6, further comprising automatically computing the drift value by:

determining that a hunk of the plurality of hunks starts after the anchor line;

in response thereto, determining that the drift value is zero.

9. The method of claim 6, further comprising determining that the code change suggestion cannot be applied if a hunk of the plurality of hunks overlaps the anchor line.

10. A non-transitory machine readable medium comprising instructions for automatically updating source code in a first source code branch using a pull request user interface, the instructions when executed by a processor, cause a computing device to:

display, on a display of the computing device, the pull request user interface associated with the first source code branch and associated with a pull request to merge the first source code branch into a second source code branch, the pull request user interface comprising:

a panel displaying source code associated with an intermediate merge between a tip of the first source code branch and a tip of the second source code branch and a code change suggestion; and a selectable affordance associated with the code change suggestion to accept the code change suggestion, wherein the code change suggestion includes an original line of source code from the intermediate merge to be changed and a new line of source code suggested by a user via the pull request user interface to replace the original line of source code;

receive user input on the selectable affordance associated with the code change suggestion;

propagate a source code change from the intermediate merge to the first source code branch such that an original line of source code in the first source code branch that corresponds to the original line of source code from the intermediate merge is replaced with the new line of source code suggested by the user; and upon successfully propagating the source code change to the first source code branch, update the pull request user interface associated with the first source code branch to indicate that the code change suggestion is applied and the pull request is modified.

11. The non-transitory machine readable medium of claim 10, wherein to propagate the source code change from the intermediate merge to the first source code branch, further comprising instructions which when executed by the processor cause the computing device to:

determine whether the original line of source code from the intermediate merge is a source code line that is added by the first source code branch;

upon determining that the original line of source code from the intermediate merge is the source code line that is added by the first source code branch, calculate a difference from the intermediate merge to the first source code branch;

upon determining that the original line of source code from the intermediate merge is a source code line that is unchanged by the first source code branch, calculate a difference from the tip of the second source code branch to the first source code branch; and save the calculated difference.

12. The non-transitory machine readable medium of claim 11, further comprising instructions which when executed by the processor cause the computing device to determine whether any changes are identified in the difference.

13. The non-transitory machine readable medium of claim 12, further comprising instructions which when executed by the processor cause the computing device to:

identify a line number associated with the original line of source code in the intermediate merge;

determine that the line number of the original line of source code from the intermediate merge directly corresponds with a line number of a corresponding line of source code in the first source code branch if no changes are identified in the difference; and apply the code change suggestion by replacing the source code on the line number in the first source code branch with the new line of source code.

14. The non-transitory machine readable medium of claim 12, further comprising instructions which when executed by the processor cause the computing device to:

identify a line number associated with the original line of source code in the intermediate merge and assigning this line as an anchor line;

determine that the line number of the original line of source code from the intermediate merge does not directly corresponds with the line number of a corresponding line of source code in the first source code branch if changes are identified in the difference; and determine a difference between the line number of the original line of source code in the intermediate merge and the line number of the corresponding line of source code in the first source code branch; and drift the source code in the first source code branch by a number of lines corresponding to the difference between the line number of the anchor line and the corresponding line of source code in the first source code branch and replace the source code on that line number with the new line of source code.

15. The non-transitory machine readable medium of claim 14, wherein to determine the difference between the line number of the original line of source code in the intermediate merge and the line number of the corresponding line of source code in the first source code branch, further comprising instructions which when executed by the processor cause the computing device to:

retrieve the changes identified in the difference, wherein the changes include a plurality of hunks;

for each hunk, automatically compute a drift value representing a number of lines of the source code by which the anchor line has changed with respect to the first source code branch;

update the anchor line number based upon the drift value; and repeat the computing and updating steps for all other hunks.

16. The non-transitory machine readable medium of claim 15, to automatically compute the drift value, further comprising instructions which when executed by the processor cause the computing device to:

determine whether a hunk of the plurality of hunks starts and finishes before the anchor line;

determine the drift value as a size of the hunk in the first source code branch.

17. The non-transitory machine readable medium of claim 15, to automatically compute the drift value, further comprising instructions which when executed by the processor cause the computing device to:

determine whether a hunk of the plurality of hunks starts after the anchor line; and in response thereto, determine that the drift value is zero.

18. The non-transitory machine readable medium of claim 15, further comprising instructions which when executed by the processor cause the computing device to determine that the code change suggestion cannot be applied if a hunk of the plurality of hunks overlaps the anchor line.

* * * * *